US008495482B2

(12) United States Patent
Cohen et al.

(10) Patent No.: US 8,495,482 B2
(45) Date of Patent: Jul. 23, 2013

(54) METHODS, SYSTEMS, AND COMPUTER READABLE MEDIA FOR AUTOMATICALLY AND SECURELY CITING AND TRANSFERRING ELECTRONICALLY FORMATTED INFORMATION AND FOR MAINTAINING ASSOCIATION BETWEEN THE CITED OR TRANSFERRED INFORMATION AND BACK-END INFORMATION

(75) Inventors: Zachary Cohen, Waltham, MA (US); Stephen L W Jacobs, Brighton, MA (US)

(73) Assignee: Zac Inc., LLC, Waltham, MA (US)

( * ) Notice: Subject to any disclaimer, the term of this patent is extended or adjusted under 35 U.S.C. 154(b) by 230 days.

(21) Appl. No.: 12/468,850

(22) Filed: May 19, 2009

(65) Prior Publication Data

US 2009/0287988 A1 Nov. 19, 2009

Related U.S. Application Data

(60) Provisional application No. 61/054,368, filed on May 19, 2008.

(51) Int. Cl.
*G06F 17/00* (2006.01)
(52) U.S. Cl.
USPC ............ 715/204; 715/234; 715/253; 715/266
(58) Field of Classification Search
USPC .................................................. 715/204, 234
See application file for complete search history.

(56) References Cited

U.S. PATENT DOCUMENTS

| 6,240,430 B1 | 5/2001 | Deike et al. |
| 6,272,505 B1 | 8/2001 | De La Huerga |
| 6,356,287 B1 | 3/2002 | Ruberry et al. |
| 6,366,823 B1 | 4/2002 | Shirayanagi |
| 6,366,923 B1 | 4/2002 | Lenk et al. |
| 6,596,030 B2 | 7/2003 | Ball et al. |
| 6,944,821 B1 | 9/2005 | Bates et al. |
| 6,994,821 B1 | 2/2006 | Dundas et al. |
| 7,178,102 B1 | 2/2007 | Jones et al. |
| 7,373,603 B1 | 5/2008 | Yalovsky et al. |

(Continued)

OTHER PUBLICATIONS

Herb Tyson, Microsoft Word 2007 Bible, Mar. 12, 2007, sec. 36.1.2. 2.*

(Continued)

*Primary Examiner* — Doug Hutton, Jr.
*Assistant Examiner* — Ariel Mercado
(74) *Attorney, Agent, or Firm* — Jenkins, Wilson, Taylor & Hunt, P.A.

(57) ABSTRACT

Methods, systems, and computer readable media for automatically and securely citing and transferring electronically formatted information and for maintaining association between the cited or transferred information and back-end information are disclosed. According to one method, a selection of media content copied from an electronic source is received. The selection of media content is inserted into an electronic destination. Citation information is automatically determined for the selection of media content by parsing a data structure provided by an author or publisher of the media content. The citation information is automatically inserted into the electronic destination. The inserted selection of media content and the citation are made uneditable.

25 Claims, 16 Drawing Sheets

U.S. PATENT DOCUMENTS

| | | | |
|---|---|---|---|
| 7,844,899 B2 * | 11/2010 | Boucher | 715/266 |
| 2005/0183011 A1 * | 8/2005 | Keohane et al. | 715/539 |
| 2005/0185792 A1 * | 8/2005 | Tokutani et al. | 380/30 |
| 2006/0064394 A1 * | 3/2006 | Dettinger et al. | 707/1 |
| 2006/0218492 A1 * | 9/2006 | Andrade | 715/523 |
| 2008/0071803 A1 * | 3/2008 | Boucher | 707/100 |
| 2008/0168277 A1 * | 7/2008 | Forlenza et al. | 713/189 |
| 2008/0320579 A1 * | 12/2008 | Rollins et al. | 726/10 |

OTHER PUBLICATIONS

Herb Tyson, Microsoft Word 2007 Bible, Mar. 12, 2007, Chapter 44, Section 44.4.2.*

"Serial Item and Contribution Identifier," American National Standard Z39.56, pp. 1-25 (1991).

* cited by examiner

Source Document - Web Browser 500

Give Plagiarism the Weight It Deserves

Cut-and-paste plagiarism from the Internet is increasing, according to the 2005 study from The Center for Academic Integrity (www.academicintegrity.org/cai %5fresearch.asp). The research findings showed that 40 percent of almost 50,000 undergraduates questioned have plagiarized from the Net, up from only 10 percent in 1999. What is more, fully 77 percent did not view such activity as a serious issue. For educators, this is sufficient to put plagiarism near the top of the information crimes agenda. You might not think that this is a topic for an information literacy column, but most standards in this field include the ethical use of information, which puts plagiarism front and center. Plagiarism is presenting someone else's words or ideas as one's own, thus constituting misrepresentation and fraud. If I were to try to convince the world that it was I, not Pablo Picasso, who painted The Old Guitar Player, I would be labeled a fraud. Similarly, if I let on that I was the author of information that was someone else's, I would, in effect, be guilty of stealing the credit for that which is not mine. We know what to look for--uneven language styles, language styles that differ from other work that has been presented, and ideas that are more sophisticated than or different from the writer's normal work. The real challenge is to help students recognize plagiarism as a problem and to correct it. 502

THE PLAGIARISM OF IGNORANCE

To be charitable, many people have no idea they are committing plagiarism. They use sources carelessly or falsely believe that information can be appropriated at will. One person's plagiarism is another person's research, isn't it? If it's on the Net and it's free to use, why can't I just copy and paste it? Fortunately, we can overcome ignorance with education, so this aspect of plagiarism finds a ready solution. We can explain the scope of what students need to cite (words, unique ideas), and we can show students how to present ideas effectively to minimize the use of source's terminology. We can show students models of good academic writing that gives credit where it is due. I caution students to avoid paraphrasing (sentence-by-sentence rewriting), because it usually leads to plagiarism. A much better method is to read the source material and summarize it in briefer form. This takes the researcher away from the actual language of the source and demonstrates understanding of the material. There are many Web sites available to guide us in the basics, but some plagiarism is resistant to easy solutions. 504

THE PLAGIARISM OF THE EASY PATH

There are students and information workers who think the risk of getting caught is worth the benefit, preferring the broad way that might lead to destruction to the narrow road that leads to honest enlightenment. We've made things even easier by providing them with so much digital content. Cut and paste is so easy, and the result can look so good, that it's worth the chance of getting caught. While some of these types of plagiarists are just plain sneaky, others are desperate. These are the people who believe they lack the skills to pull off their own research projects. Perhaps English is not their first language, or they have trouble expressing themselves in words, or their powers of critical thinking are not up to snuff. The temptation simply to let other (better?) writers do most of the muscle work is powerful, because the possibility of survival is a bigger draw than the fear of detection. 510 506

CiteIt 512

Badke, William, Give Plagiarism the Weight It Deserves, 2007 Date of retrieval 4-Mar-2008. http://goliath.eenext.com/coms2/gi_0199-6979794/Give-plagiarism-the-weight-it.html 508

Destination Document - Word Processing Application

John Smith                                    Big State University
English 101                                    01/01/2001

802

It becomes clear that students do not view "copy and paste" cheating as wrong. Many of them do not even believe that cheating is wrong. In fact, a great number of students today see success as the trump card used for justifying unethical acts. (X) Combine these statistics with the ease of use of technology and the result is terrifying to anyone remotely concerned with the quality of education. "The research findings showed that 40 percent of almost 50,000 undergraduates questioned have plagiarized from the Net, up from only 10 percent in 1999. What is more, fully 77 percent did not view such activity as a serious issue" (Badke).

"We've made things even easier by providing them with so much digital content. Cut and paste is so easy, and the result can look so good, that it's worth the chance of getting caught (Badke).

Citation Xml Schema (XSD)

```xml
<?xml version="1.0" encoding="utf-8"?>
<xs:schema id="CiteIt_Citation" targetNamespace="http://
tempuri.org/CiteIt_Citation.xsd"
elementFormDefault="qualified" xmlns="http://
tempuri.org/CiteIt_Citation.xsd" xmlns:mstns="http://
tempuri.org/CiteIt_XmlSchema.xsd" xmlns:xs="http://
www.w3.org/2001/XMLSchema">
   <xs:element name="Citation">
     <xs:complexType>
       <xs:sequence>
         <xs:element name="Version" type="xs:date" />
         <xs:element name="Title"
type="xs:normalizedString" />
         <xs:element name="Authors">
           <xs:complexType>
             <xs:sequence>
               <xs:element name="Author">
                 <xs:complexType>
                   <xs:sequence>
                     <xs:element name="prefix"
type="xs:normalizedString" />
                     <xs:element name="First"
type="xs:normalizedString" />
                     <xs:element name="Middle"
type="xs:normalizedString" />
                     <xs:element name="Last"
type="xs:normalizedString" />
                     <xs:element name="SuffixSocial"
type="xs:normalizedString" />
                   </xs:sequence>
                 </xs:complexType>
               </xs:element>
             </xs:sequence>
           </xs:complexType>
         </xs:element>
         <xs:element name="Publisher"
type="xs:normalizedString" />
         <xs:element name="PublicationDate"
type="xs:date" />
         <xs:element name="WebSiteUrl" type="xs:anyURI" /
>
         <xs:element name="Quotes">
           <xs:complexType>
             <xs:sequence>
               <xs:element name="Quote"
type="xs:string" />
             </xs:sequence>
           </xs:complexType>
         </xs:element>
         <xs:element name="VolumeNumber"
type="xs:normalizedString" />
         <xs:element name="IssueNumber"
type="xs:normalizedString" />
         <xs:element name="SectionTitle"
type="xs:normalizedString" />
         <xs:element name="PageNumbers">
```

FIG. 11A

```
            <xs:simpleType>
                <xs:list itemType="xs:integer:/>
            </xs:simpleType>
        </xs:element>
        <xs:element name="RetrievalDateTime"
type="xs:dateTime" />
        <xs:element name="ISBN"
type="xs:normalizedString" />
        <xs:element name="DOI"
type="xs:normalizedString" />
        <xs:element name="PMID"
type="xs:normalizedString" />
        <xs:element name="SICI"
type="xs:normalizedString" />
        <xs:element name="LSID"
type="xs:normalizedString" />
        <xs:element name="PlayScene"
type="xs:normalizedString" />
        <xs:element name="PlayLine"
type="xs:normalizedString" />
        <xs:element name="CitationContent">
            <xs:simpleType>
                <xs:restriction base="xs:string">
                    <xs:enumeration value="Book" />
                    <xs:enumeration value="JournalArticle" />
                    <xs:enumeration value="NewspaperArticle" />
                    <xs:enumeration value="Play" />
                    <xs:enumeration value="Poem" />
                    <xs:enumeration value="WebAriicle" />
                </xs:restriction>
            </xs:simpleType>
        </xs:element>
        <xs:element name="CitationStyle">
            <xs:simpleType>
                <xs:restriction base="xs:string">
                    <xs:enumeration value="APA" />
                    <xs:enumeration value="Chicago" />
                    <xs:enumeration value="GB7714" />
                    <xs:enumeration value="ISO690Harvard" />
                    <xs:enumeration value="MLA" />
                    <xs:enumeration value="Turabian" />
                </xs:restriction>
            </xs:simpleType>
        </xs:element>
    </xs:sequence>
  </xs:complexType>
 </xs:element>
</xs:schema>
```

FIG. 11B

CitationCipherText XML Schema (XSD)

```xml
<?xml version="1.0" encoding="utf-8"?>
<xs:schema id="CiteIt_CitationEncrypted"
targetnamespace="http://tempuri.org/
CiteIt_CitationEncrypted.xsd"
elementFormDefault="qualified" xmlns="http://
tempuri.org/CiteIt_CitationEncrypted.xsd"
xmlns:mstns="http://tempuri.org/
CiteIt_CitationEncrypted.xsd" xmlns:xs="http://
www.w3.org/2001/XMLSchema">
   <xs:element name="EitationEncrypted">
     <xs:complexType>
       <xs:sequence>
         <xs:element name="Version" type="xs:date" />
         <xs:element name="Signature"
type="xs:base64Binary" />
         <xs:element name="PublicKey"
type="xs:base64Binary"/>
         <xs:element name="Citation"
type="xs:base64Binary" />
       </xs:sequence>
     </xs:complexType>
   </xs:element>

</xs:schema>
```

FIG. 12

CiteIt XML Document

```
<Citation>
    <Version>1.0</Version>
    <Title>How to Create Successful Web Projects</Title>
    <Publisher>Swartz Press, Inc.</Publisher>
    <Authors>
        <Author>
            <First>Edmund</First>
            <Middle>Joseph></Middle>
            <Last>Swartz</Last>
            <SuffixSocial>Junior</SuffixSocial>
        </Author>
    </Authors>
    <PublicationDate>20080222</PublicationDate>
    <WebSiteUrl>http://www.SandyPondConsulting.com</ WebSiteUrl>
</Citation>
```

FIG. 13

CiteIt Citation HTML Element

| | |
|---|---|
| | `<textarea name="BrownCowArticle"`<br>`style="display:none;visibility:hidden">` |
| | `<CitationCipherText>`<br>    `<Version>1.0</Version>`<br>    `<CitationCipherText>(A series of base64binary characters)`<br>    `</CitationCipherText>`<br>`</CitationCipherText>` |
| | `</textarea>` |
| | `<p>`<br>`The brown cow jumped over the moon. Then the cat and the dogs raced after the cow jumping the fence too.`<br>`</p>` |
| | `<input type="button" name="CiteIt"`<br>`CiteItXml="BrownCowArticle" value="CiteIt">` |

FIG. 14

METHODS, SYSTEMS, AND COMPUTER READABLE MEDIA FOR AUTOMATICALLY AND SECURELY CITING AND TRANSFERRING ELECTRONICALLY FORMATTED INFORMATION AND FOR MAINTAINING ASSOCIATION BETWEEN THE CITED OR TRANSFERRED INFORMATION AND BACK-END INFORMATION

RELATED APPLICATIONS

This application claims the benefit of U.S. Provisional Patent Application Ser. No. 61/054,368 filed May 19, 2008; the disclosure of which is incorporated herein by reference in its entirety.

TECHNICAL FIELD

The subject matter described herein relates to citing and transferring electronically formatted information. More particularly, the subject matter described herein relates to methods, systems, and computer readable media for automatically and securely citing and transferring electronically formatted information and for maintaining association between the cited or transferred information and back-end information.

BACKGROUND

In the production of secondary documents, quoting and citing the written work of another author is a common practice. However, inaccurate or incomplete quotes and citations, as well as outright plagiarism may also be a common practice. Publishers of written works typically desire both a wide audience and accurate citation of published works, and these goals can often conflict with each other. For example, a publisher may have articles that the publisher wants to publish to potential readers while ensuring that the articles are fully and correctly cited when users copy quotes from the articles. Conventionally, the publisher of a web-based article displays the article text and citation information in a web page. Citation information may be embedded within the article itself or may be located separately from the article, for example, on a web page accessible via a hyperlink in the article.

Typically, a user viewing a web page may wish to create a secondary document that includes selected material from the source document. For example, a college student may have the task of writing a paper and, during his or her research, the user may locate and select quotes from the source article, copy the text to the system clipboard, and paste the text from the clipboard into a word processing application.

In addition to quoting the selected source material, users may cite the author of the source material by listing the title of the source material, the publication date, the author's name, the publication volume number, issue number, and other pieces of information which identify the source document, or identify the author or publisher of the source document. These citations may be formatted as parenthetical citations, footnotes, endnotes, citation references, bibliographies, reference sections, or other formats in the user's secondary document.

According to one conventional method, the user may manually quote and cite the portion of text from the web-based article by selecting text from existing source documents and either copying and pasting the objects in a word processing application or hand transcribing the text and citations into the destination document. According to the "copy and paste" method, a user may copy an article displayed as web page, PDF, or other electronically formatted document and paste it into a destination document. As used herein, "copy and paste" refers to a series of steps performed by a computer user to copy objects from a source document into a destination document wherein the user selects an object (such as text or image), keys Ctrl-C, moves the insertion point to a new position in the same or another document, and keys Ctrl-V. There are several problems with the current methods of copying and pasting objects and citation information from a source document to a destination document.

One problem with conventional methods of copying and pasting quoted material from a source document to a destination document is that the user may choose not to cite the source of the object.

Another problem with conventional methods of copying and pasting quoted material from a source document to a destination document is that the user may mistype the citation information in the user's new document.

Another problem with conventional methods of copying and pasting quoted material from a source document to a destination document is that the user may omit important citation information about the objects in the user's new document.

Another problem with conventional methods of copying and pasting quoted material from a source document to a destination document is that the user must hand-format citations because many document processing applications do not have automatic citation formatting features.

Another problem with conventional methods of copying and pasting quoted material from a source document to a destination document is that the user may improperly format or inconsistently format citations in the user's new document.

For example, users, such as students, may be under time pressures to write and submit documents by a deadline. Because late papers are either not accepted or are penalized, students may decide to skip citing sources in order to quickly complete an assignment and submit the assignment for grading by the deadline. Users of periodicals or other publications (which are published on a deadline) may elect to leave out citations in order to hand in the articles by the submission deadline. Omitting citation information can result in: students being expelled from school or college, professional users being fired, users' fees being withheld, users being asked to return writing fees, or damage to a user's career or credibility. Additionally, a publisher, such as a university, a newspaper, a book publisher, or other high-profile publishers may have its reputation tarnished by publishing documents which are not properly cited.

There are several computer automated systems or features of document processing applications for handling or formatting citations. However, these systems do not provide all the features required to correctly and fully cite objects copied from a source document.

For web-based systems, the user may locate a book, journal, or article from which the user wants to cite an object. The system displays any citation information, such as: title, author's name, publisher, publication date, city of publication, etc, known to the system. Then, the user has the option of adding information for missing fields, or the user can change the citation information. The system formats the citation and the user can copy the formatted citation into the user's document. For document processing applications which provide bibliography formatting features, the citation information is simply formatted in a bibliography. There are several significant disadvantages to these systems.

One problem associated with conventional systems for automatically generating and/or formatting citation information is that the user might elect to not cite the selected objects. For example, because citing quoted material is not a requirement for inserting the quoted material into a secondary document according to conventional systems, a user may include quoted material but choose not to cite it.

Another problem associated with conventional systems for automatically generating and/or formatting citation information is that the user might change the citation information. Because citation information produced by conventional systems is editable by the user in a word processing application, the user may alter the citation information.

Another problem associated with conventional systems for automatically generating and/or formatting citation information is that the user might leave out important citation information. For example, a user may accurately quote selected material and, for the citation information provided, the citation may be accurate. However, the citation information may be incomplete, thus rendering the citation less valuable than a citation which is ensured to be both accurate and complete.

Another problem associated with conventional systems for automatically generating and/or formatting citation information is that potential readers and/or publishers of secondary documents that include quoted material cannot be sure that the secondary document has correctly quoted and cited the primary material. For example, a university professor may desire an easy, convenient, and secure method for ensuring that each paper written by his students contains accurate and complete quotations and citation information. However, conventional solutions are directed to plagiarism detection, and do not provide any indication that the quotation and citation information has been unaltered by the student. Rather, conventional systems typically include only after-the-fact detection mechanisms for comparing documents submitted by students to a database of known materials in order to determine if any duplication/overlap exists. If any material is duplicated, the professor may be automatically alerted to the possibility of plagiarism.

Outside of the scope of academics, there exists a need for an automation in the transfer of electronic media. Modern Internet users typically share and store information. The process for doing so is cumbersome and outdated. When a user wishes to share or store both the content and "back-end information" (e.g., Title, Author, Hyperlink, etc.) associated with any piece of electronic media, multiple steps are required. A user may wish to share or store information instantly from any web-enabled device. The information should be accessible and easy to manipulate. Modern Internet users may also demand that the destination of this information take the form of multiple applications. Although the automated citation system described above automatically generates some citation information regarding a source document, the only repository for the citation or the quoted information is the destination document itself, and the only associations between the citation and the copied information are in the source and destination documents. In such a system, a third party cannot verify the citation if the source web page from which the quoted information was copied changes.

In light of these difficulties, there exists a long felt need for methods, systems, and computer readable media for automatically and securely citing and transferring electronically formatted information and for maintaining association between the cited or transferred information and back-end information.

SUMMARY

Methods, systems, and computer readable media for automatically and securely citing and transferring electronically formatted information and for maintaining association between the cited or transferred information and back-end information are disclosed. According to one method, a selection of media content copied from an electronic source is received. The selection of media content is inserted into an electronic destination. Citation information is automatically determined for the selection of media content by parsing a data structure provided by an author or publisher of the media content. The citation information is automatically inserted into the electronic destination. The inserted selection of media content and the citation information are made uneditable. The method is implemented by at least one computer.

According to another aspect, the subject matter described herein includes a method for automatically and securely transferring electronically formatted information and for maintaining association between the transferred information and back-end information. The method includes receiving a selection of media content copied from an electronic source. The method further includes inserting the selection into an electronic destination. The method further includes automatically determining back-end information for the selection by parsing a data structure provided by an author or publisher of the media content. The method further includes storing the selection and back-end information in a repository separate from the electronic source and the electronic destination. The method further includes inserting, into the electronic destination, a link to the selection and back-end information stored in the repository. The method further includes maintaining the stored selection and back-end information in the repository such that it can be accessed via the link. The method is implemented by at least one computer.

According to another aspect, the subject matter described herein includes a system for automatically and securely citing electronically formatted information. The system includes a media content selection module implemented by at least one computer for receiving, a selection of media content copied from an electronic source, for inserting the selection of media content into an electronic destination, and for making the inserted selection of media content uneditable. The system further includes a citation module implemented by the at least one computer for automatically determining citation information for the media content and automatically generating and inserting the citation information into the electronic destination and making the citation information uneditable.

According to another aspect of the subject matter described herein, a system for automatically and securely transferring electronically formatted information and for maintaining association between the transferred information and back-end information is provided. The system includes a media content selection module implemented by at least one computer for receiving a selection of media content copied from an electronic source and for inserting the selection into an electronic destination. The system further includes a citation module implemented by at least one computer for automatically determining back-end information for the selection by parsing a data structure provided by an author or publisher of the media content. The system further includes an association module implemented by the at least one computer for storing the selection and the back-end information in a repository separate from the electronic source and the electronic destination, wherein the stored selection and back-end information are maintained in the repository such that the stored selection and back-end information can be accessed via the link.

As used herein, the term "user" refers to a person creating an electronic destination document containing at least one quote from an electronic source document. For example, a user may locate and select quotes from articles displayed on web sites and import the quotes and citations into the user's document.

As used herein, the term "add-in" or "plug-in" refers to a custom software module running in the context of an application. Add-ins typically share the host application's user interface and have a well-defined boundary to their possible set of actions. For example, a software developer could create a Microsoft Word Add-in using the Visual Studio Tools for Office development tool kit.

As used herein, the term "extension" refers to a computer program that is incorporated into a host application in order to enhance the functionality of the host application. Extensions modify or add to existing functionality of the host application. Extensions generally have fewer restrictions on their actions, and may provide their own user interfaces.

As used herein, the term "Browser Helper Object" (BHO) refers to a software add-in or extension that provides custom functionality to web browsers. BHOs execute in the content of the browser and can receive notification of user activities such as keyboard or mouse input. For example, a BHO for use with the Internet Explorer Browser produced by Microsoft of Redmond, Wash. may be called an Internet Explorer Extension.

As used herein, the term "Extensible Markup Language" (XML) refers to a means for storing and transporting data across different information systems, including the Internet. Specifically, XML is a specification for creating custom markup languages (i.e., it allows its users to define their own elements) and may be used both to encode documents and to serialize data. XML specifications 1.0 and 1.1 published as W3C recommendations on Aug. 16, 2006 are incorporated herein by reference.

As used herein, the term "XML schema" refers to a description of a type of XML document. Typically, an XML schema may be expressed in terms of constraints on the structure and content of XML documents of a particular type which may include constraints on the structure additional to the basic syntax constraints imposed by XML itself. Thus, an XML schema provides a view of the document type at a relatively high level of abstraction.

The subject matter described herein for automatically and securely transferring electronically formatted information and for maintaining association between the cited or transferred information and back-end information can be implemented using the computer readable medium having stored thereon executable instructions that when executed by the processor of a computer control the computer to perform steps. Exemplary computer readable media suitable for implementing the subject matter described herein include: computer readable storage media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which:

FIG. 5 is a screenshot of an exemplary source document displayed in a web browser containing a text selection to be quoted in a destination document according to an embodiment of the subject matter described herein;

FIG. 8 is a screenshot of an exemplary destination document viewed in a word processing application for receiving a selection of text copied from a source document according to an embodiment of the subject matter described herein;

FIGS. 11A and 11B illustrate an exemplary XML schema for transferring article data between a web server, a web browser, and a destination document according to an embodiment of the subject matter described herein;

FIG. 12 illustrates an exemplary XML schema for transferring a ciphertext version of citation information between a web server, a web browser, and a destination document according to an embodiment of the subject matter described herein;

FIG. 13 illustrates an exemplary XML document using a Citation XML Schema according to an embodiment of the subject matter described herein; and FIG. 14 illustrates an exemplary format for sending citation information to a web browser according to an embodiment of the subject matter described herein.

DETAILED DESCRIPTION

The subject matter described herein includes methods, systems, and computer readable media for automatically and securely citing electronically formatted information.

Figure 1:
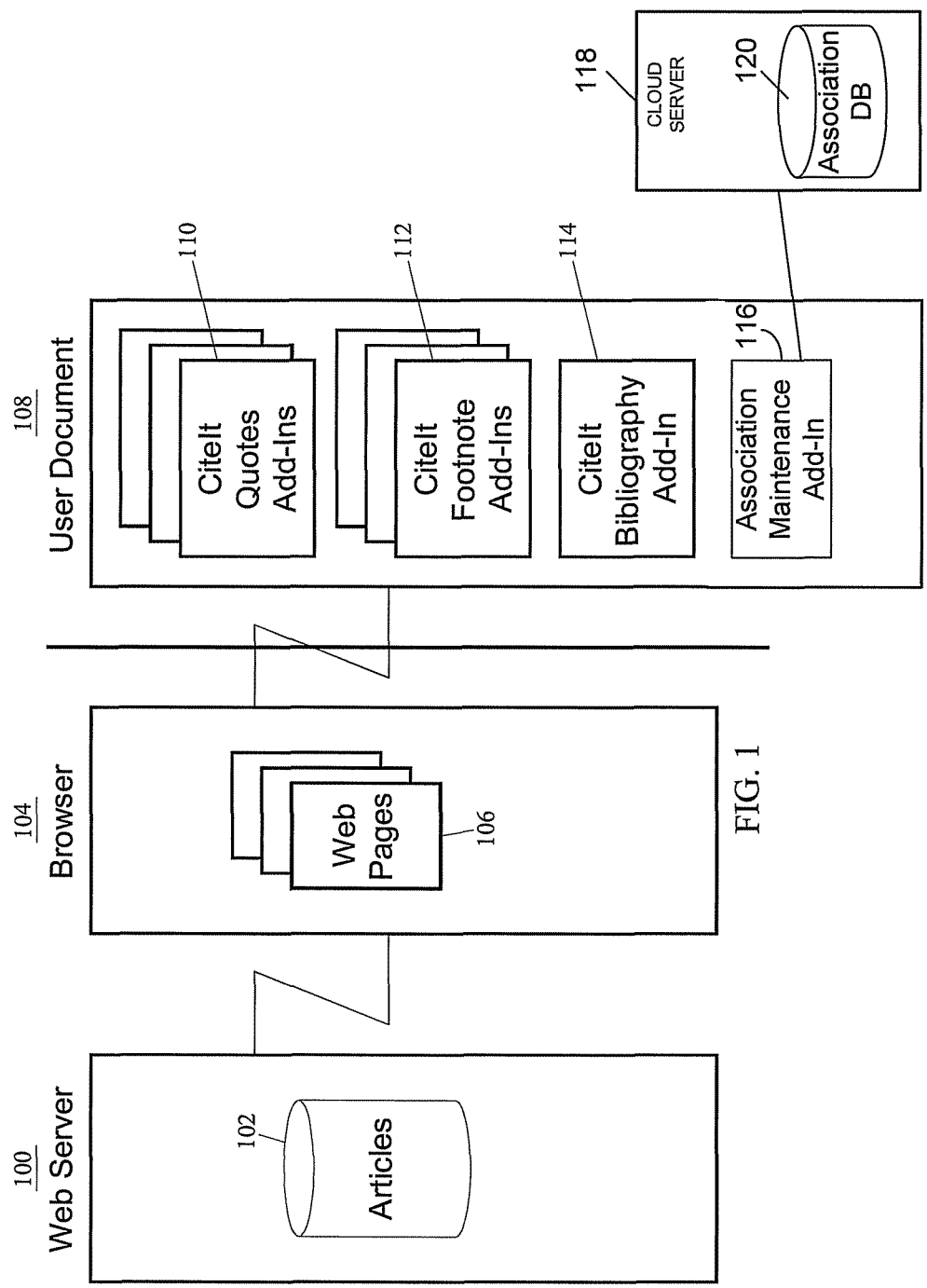
FIG. 1 is a system diagram of exemplary components for automatically and securely citing electronically formatted information and for maintaining association between the cited or transferred information and back-end information according to an embodiment of the subject matter described and transferred.

FIG. 1 is a system diagram of exemplary components for automatically and securely citing and transferring electronically formatted information and for maintaining association between the cited or transferred information and back-end information according to an embodiment of the subject matter described herein. Referring to FIG. 1, web server 100 may contain one or more articles 102 or other media content, including, images, audio, or video, for display to a user.

Articles 102 may be included in one or more web pages, such as hypertext markup language (HTML) pages. As used herein, a web server may include a computer program that accepts hypertext transfer protocol (HTTP) requests from web clients, such as web browsers, and serves clients by issuing HTTP responses. Alternatively, a web server may refer to a computer that executes the computer program described above. It is appreciated that a web server and web client may indicate a relationship between two computer programs in which the client makes a service request from the server, which fulfills the request. One commercially available example of web server 100 includes the Apache™ web server available from the Apache Software Foundation of Forest Hill, Md.

An exemplary web client for viewing pages served by web server 100 may include web browser 104. Web browser 104 may communicate with web server 100 via a variety of suitable communications protocols including, but not limited to HTTP, in order to retrieve and display web pages. In order to view articles 102, web browser 104 may request and temporarily store (i.e., cache) one or more web pages 106. For example, web browser 104 may communicate with web server 100 using HTTP/1.1 that is described in RFC 2616 and is incorporated in its entirety herein by reference. One commercially available example of web browser 104 includes the Firefox™ web browser available from Mozilla Corporation of Mountain View, Calif.

In addition to web browser 104, word processing document 108 may be viewed on a client computer for editing by a user. As used herein, a word processing document includes an electronically editable document including text which may be displayed by a word processing application. One commercially available example of word processing document 108 and word processing application includes a Microsoft Word document (i.e., .doc, .docx, etc.) editable using Microsoft Word™ available from Microsoft Corporation of Redmond, Wash.

Word processing document 108 may include one or more add-in modules for automatically and securely quoting and citing text from articles 102. For example, quotes module 110 may securely insert a selected quote from a web page into a destination word processing document by enciphering the copied text until is it pasted into the destination document, and once inserted, locking the text so as to make it uneditable by the user. Footnote module 112 may automatically and securely generate footnote citation information for selected quotes by retrieving enciphered or cleartext citation information provided by the author/publisher of the article and placing the information in the appropriate format indicate by the user. In a similar manner, bibliography module 114 may automatically and securely generate a bibliography by retrieving enciphered citation information provided by the author/publisher of the article and placing the information in the appropriate format indicate by the user.

An association maintenance module 116 may maintain associations between transferred or cited information and the back-end information (e.g., the citation information) by uploading the back-end information and the cited or transferred media content to cloud server 118. Cloud server 118 may store the media content and the associated back-end information in association database 120. Association maintenance module 118 may also insert a link in the destination document so that the user or another user can verify the copied media content and the back-end information.

Footnote module 112 and bibliography module 114 will be generically referred to herein as "citation modules," as these modules automatically obtain citation or back-end information and transfer that information to an electronic destination. Similarly, quotes module 110 will be generically referred to herein as "media content selection module," because quotes module 110 receives user selection of media content to be transferred from an electronic source to an electronic destination and inserts the transferred media content into the electronic destination.

For example, when quotes module 110 receives text or other information that a user copies from a web page, quotes module 110 may format the media content in the appropriate format for the electronic destination, such as user document 108. Footnote and bibliography modules 112 and 114 may determine the back-end information by parsing the data structure provided by an author or publisher of the media content. Association maintenance module 116 may store the selection and the back-end information in database 120 maintained by cloud server 118 and insert a link in the destination document. The link may specify cloud server 118 and an identifier for the record in database 120 that contains the selection and the back-end information. Cloud server 118 may maintain the stored selection and back-end information in the repository such that it can be accessed via the link. Because the association between the copied media content and the back-end information is maintained, verification of the quoted information and the back-end information is facilitated over methods that rely on the original web server to maintain the association.

Each of the modules illustrated in FIG. 1 may be implemented by one or more computers programmed to perform the functions described above. For example, the citation modules and the media content selection module may be implemented by a user's computer, such as a personal computer, a smart phone, or other user computing device to format and insert media content into an electronic destination, determine the back-end or citation information, communicate both to cloud server 118, make the inserted information uneditable, etc.

Method Overview

Figure 2:
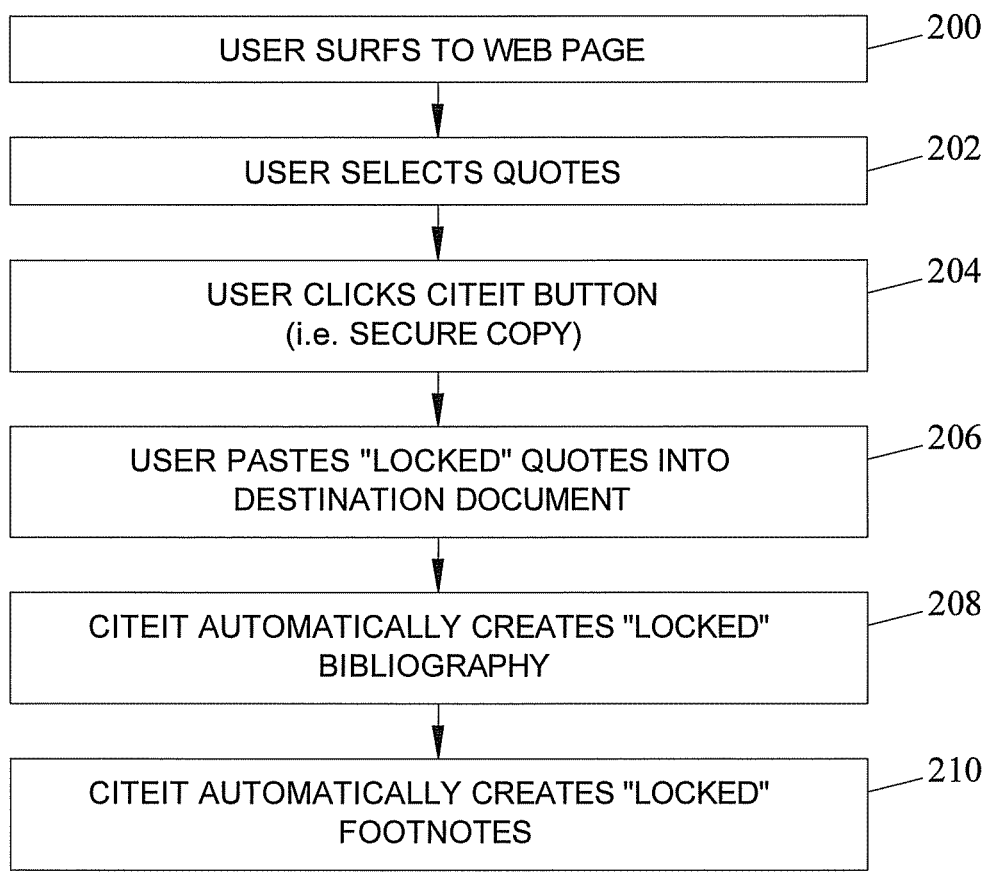
FIG. 2 is a flow chart of exemplary steps for automatically and securely citing electronically formatted information according to an embodiment of the subject matter described herein.

FIG. 2 is a flow chart illustrating exemplary steps for automatically and securely citing electronically formatted information according to an embodiment of the subject matter described herein. The description provided below is intended simply as an overview of an exemplary process for automatically and securely copying, pasting, and citing information into a destination word processing document. Each step will also be described in greater detail below with respect to FIGS. 3-10.

Referring to FIG. 2, in step 200, the user may surf to a web page during research for writing an academic paper or the like. The web page may be divided into one or more articles, wherein each article may have separate bibliographic information. For example, the user may use web browser software executed on a personal computer for viewing web pages served by one or more web servers. Conventionally, the process of viewing a web page may include issuing a hypertext transfer protocol (HTTP) request for a specific web page to an appropriate Internet protocol (IP) address. The web server may respond by sending a copy of the requested web page to the user's web browser, where it may be temporarily stored for display.

If the user is interested in quoting material from one or more of the articles in the web page, the user may select one or more text selections in step 202. For example, the user may select one quote from a single article, may select multiple quotes from multiple articles, or a combination thereof.

A software module working in cooperation with the web browser, document viewing application, or word processing application copies the selected quotes and citation information and packages these items together and sends the quotes and citation information to the clipboard or directly to the user's new document. The user changes focus to the user's word processing application and pastes the selected quotes and related article citation information from the clipboard into the user's destination article.

The user repeats the process of locating source articles, selecting and copying quotes and citation information to the user's destination article until the user has the quotes needed for the user's article. A word processing application Add-In or extension accepts the quotes and citation information and formats and displays the information in the user's destination document in a predefined citation style or custom citation style. The user writes the user's own commentary about the selected quotes and submits the user's article for publication, submits the user's article to the person who assigned the writing task, or publishes the completed written work for others to read.

In step 204, the user may click a "CiteIt" browser helper object operating in conjunction with the web browser for automatically and securely copying, pasting, and citing the selected text into a word processing document. By clicking the CiteIt button, the user may initiate a "secure copy" of the selected text and securely obtaining citation information. For example, the CiteIt browser helper object may obtain enciphered citation information provided the web server in order to securely obtain authentic authorship information for the selected text. The secure copy referenced in step 204 contrasts with conventional unsecure copy methods because conventional copy mechanisms may store unenciphered text (i.e., plaintext) directly to a general system clipboard memory. Because plaintext quotes may be manipulated while stored in clipboard memory, they do not provide assurance that the quote will always be accurately maintained when eventually pasted into a destination word processing document.

According to one aspect, after selecting and highlighting objects from a computer source document to be transmitted to a destination document, the transmission of the selected and highlighted objects and related citation information from a source document to a destination document may be accomplished using one or more XML documents. Publishers of articles provide citation information with written works (source documents) to ensure that users correctly cite the source of selected objects with full citation information. Storing objects and citation information in XML documents for transmission to document viewing applications allows authors and publishers to determine how document viewing applications should format and transmit citation information to a destination document.

Objects and citation information stored in XML documents may be enciphered to ensure objects and citation information are unaltered during transmission between publisher, source documents, document viewing applications, and the destination document. The sender of citation XML documents may be authenticated to a document viewing application or word processing application by using cipher algorithms and protocols. Finally, the formatting and display of the selected objects and citation information in the destination document in the form of parenthetical citations, footnotes, endnotes, bibliography, citation reference sections, or any other citation format used by users for displaying, referencing, or citing objects.

In step 206, the user may paste the selected text into a destination word processing document using the secure CiteIt browser helper object. For example, the secure CiteIt BHO may decipher the quoted text described above and paste it into an electronically editable document. However, the quote may be "locked" so as to make it uneditable after-the-fact by the user in order to prevent tampering and ensure that the text is accurately quoted. It is appreciated that while the quoted material may appear without highlighting when it is printed, a visual indication of its status as uneditable by the CiteIt module may be seen when viewed in electronic format in a suitable word processing program.

In step 208, the CiteIt system may automatically create a locked bibliography for all of the quotes contained in the destination document that are quoted using the CiteIt system. For example, CiteIt bibliography add-in 114 may generate a bibliography according to a suitable format chosen by the user by retrieving and parsing bibliographic information provided by the publisher. The content of the bibliography generated may also be uneditable by the user so as to ensure accurate citation. Because the bibliographic information is provided by the author/publisher of the article, accuracy is ensured, tampering is prevented, and no additional work is necessary for the user.

In step 210, the CiteIt system may automatically create locked footnotes for the quotes in the destination document. For example, CiteIt footnote add-in 112 may generate footnotes according to a suitable format chosen by the user by retrieving and parsing bibliographic information provided by the publisher. Similar to the bibliography described above, the content of footnotes generated by CiteIt footnote add-in 112 may be uneditable by the user so as to ensure accurate citation. Because the information contained in the footnotes is provided by the author/publisher of the article, accuracy is ensured, tampering is prevented, and no additional work is necessary for the user.

Thus, the exemplary method shown in FIG. 8 includes citing selected objects from a source document in an efficient manner to ensure that the objects and citation information are unaltered during transmission to a destination document, the citations are formatted correctly using common citation styles, and all citation information is displayed with the citation.

Thus, the method includes citing selected objects from a source document in an efficient manner to ensure that the objects and citation information are unaltered during transmission to a destination document, the citations are formatted correctly using common citation styles, and all citation information is displayed with the citation.

User Surfs to Web Page

Figure 3:
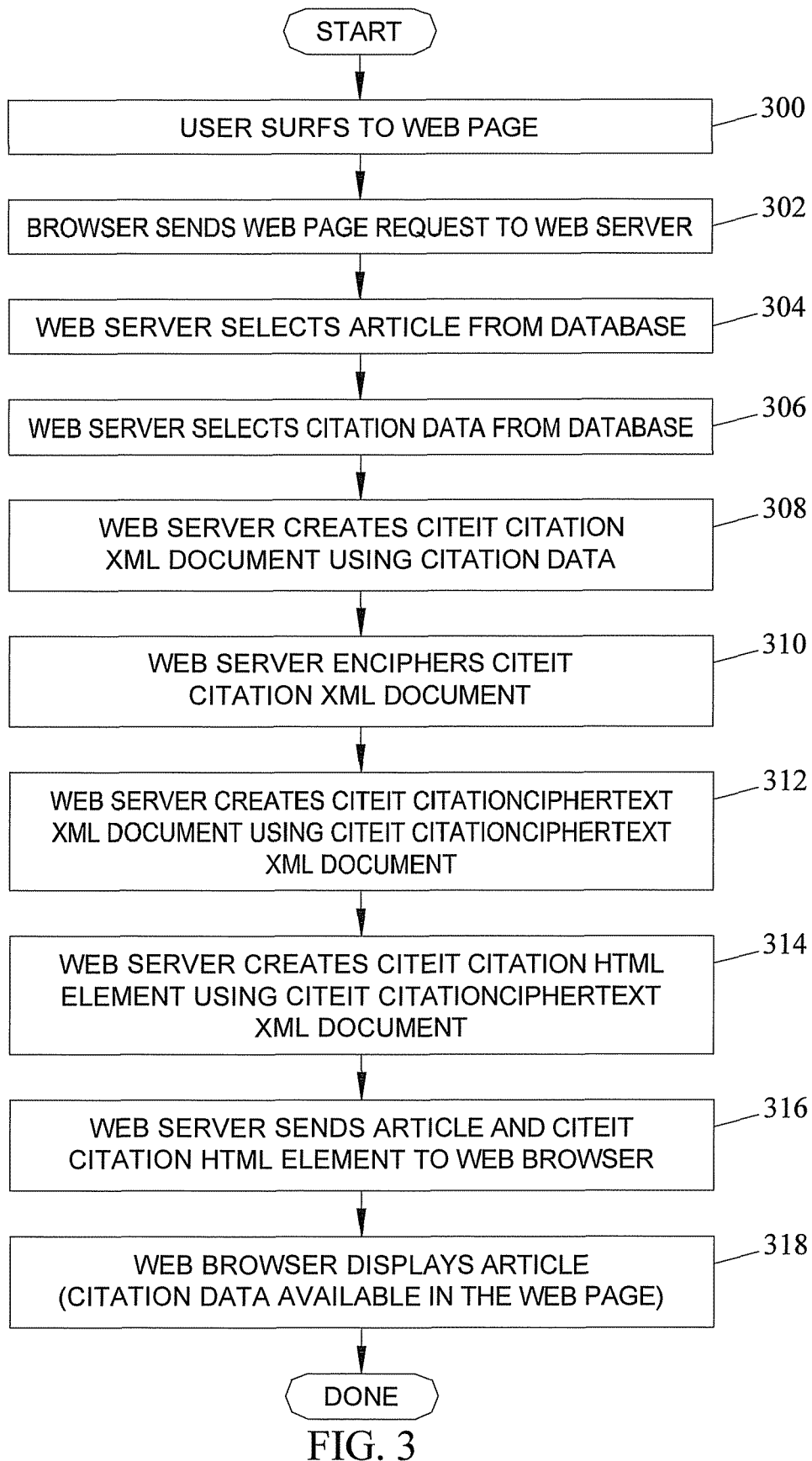
FIG. 3 is a flow chart of exemplary steps for automatically communicating citation information from a publisher to a user according to an embodiment of the subject matter described herein.

FIG. 3 is a flow chart of exemplary steps for automatically communicating citation information from a publisher to a user according to an embodiment of the subject matter described herein. Specifically, FIG. 3 is a flow chart showing the steps of a user requesting to view an article, the web server selecting the article from the database, and the browser displaying the article for the user. For example, the process illustrated in FIG. 3 includes retrieving the citation information, packaging the citation information into an XML document, enciphering the XML document, and transmitting it to the browser. Referring to FIG. 3, in step 300, the user opens a new browser window or changes focus to an existing open browser window. The user surfs in the browser window to one or more web sites searching for articles that the user wants to quote.

In step 302, the web browser sends a request to the web server for a specific web page.

In step 304, the web server selects an article from a database.

In step 306, the web server selects the article's citation information from a database.

In step 308, the web server creates a CiteIt Citation XML document using the article's citation information. The web server hashes the CiteIt Citation XML document producing a cipher message digest. The web server enciphers the cipher message digest with the Publisher's private cipher key producing a digital signature.

In step 310, the web server enciphers the CiteIt Citation XML document using the $CipherAlgorithm.

In step 312, the web server creates a CiteIt CitationCipherText XML document with the enciphered Citation XML document, message digest, Publisher's, public key and the digital signature.

In step 314, the web server creates a CiteIt Citation HTML Element with the CitationCipherText XML document.

In step 316, the web server creates an HTML page containing the article and the Citation HTML Element to the user's web browser and sends the web page to the user's browser.

In step 318, the web browser displays the web page containing the article. The Citation HTML Element is hidden from the user's view.

User Selects Quotes from Articles

Figure 4:
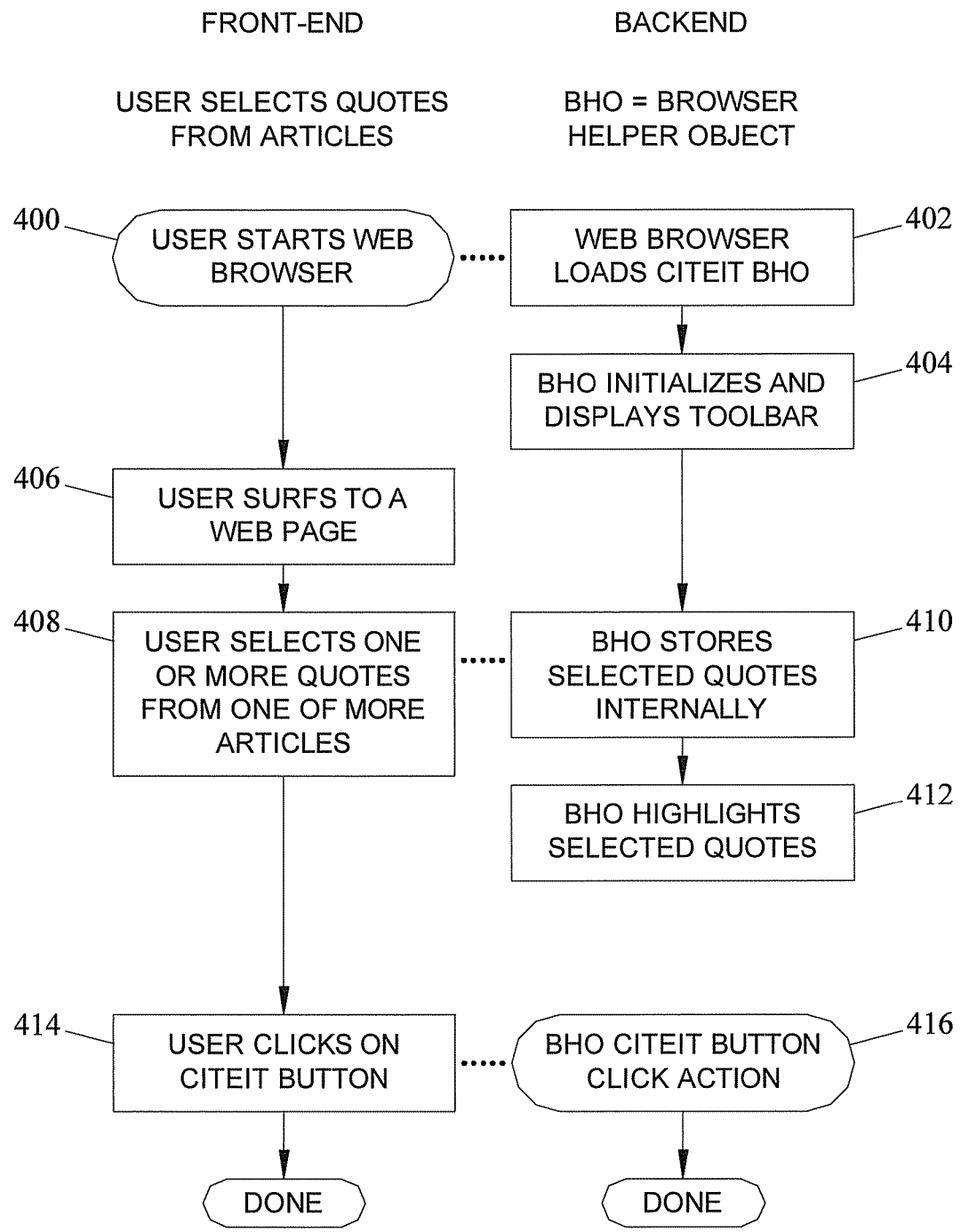
FIG. 4 is a flow chart of a exemplary steps performed by a user and a browser helper object for selecting text from a source document to be quoted in a destination document according to an embodiment of the subject matter described herein.

FIG. 4 is a flow chart of a exemplary steps performed by a user and a browser helper object for selecting text from a source document to be quoted in a destination document according to an embodiment of the subject matter described herein. Specifically, FIG. 4 is a flow chart showing the steps a user would take to select one or more quotes from an article and to send the selected quotes to the clipboard. Also, FIG. 4 illustrates exemplary steps the CiteIt software may perform in order to highlight the selected quotes, remember what quotes were selected by the user, and to send the selected quotes to the clipboard according to an embodiment of the subject matter described herein. Referring to FIG. 4, in block 400, the user opens a web browser.

In block 402, the web browser automatically loads a CiteIt browser helper object (BHO) as defined above.

In block 404, the BHO initializes and displays its toolbar. For example, the CiteIt button is displayed by the BHO toolbar or is an HTML button displayed on the web page.

In block 406, the user surfs to a webpage.

In block 408, the user selects one or more quotes using a mouse from an article displayed in the user's browser.

In block 410, the BHO stores the selected quotes internally.

In block 412, the BHO installed in the web browser highlights the selected quotes in one or more predefined or custom highlight colors and tracks which quotes were selected and highlighted. It is appreciated that the user may decide to unselect portions of selected quotes by using a mouse or clear selections of all highlighted quotes by clicking a button provided by the BHO.

In block 414, when the user has completed making quote selections the user clicks on a button titled "CiteIt".

In block 416, the BHO instructs one or more modules to paste the selected text into the destination document and securely cite the text in a format determined by the user.

FIG. 5 is an exemplary web page containing source articles for illustrating text selection using a CiteIt browser helper object according to an embodiment of the subject matter described herein. Referring to FIG. 5, web page 500 may include articles 502, 504, and 506, wherein each article may be associated with different and/or overlapping citation information. For example, articles 502-506 are associated with citation information 508, which may include a title, author, date, URL, or any other suitable information for identifying the authorship of the source material.

When a user determines a text selection to quote, the user may highlight the text by dragging the mouse cursor from the beginning to the end of the quote. For example, the user may highlight text selection 510 to be quoted in a destination document. Upon selecting the text to be copied, the user may click a CiteIt button 512 that may be embedded in, and operate in conjunction with, web browser 104. The details of exemplary steps performed when the user clicks CiteIt button 512 are described in greater detail below with respect to FIG. 6.

User Clicks BHO CiteIt Button

Figure 6:
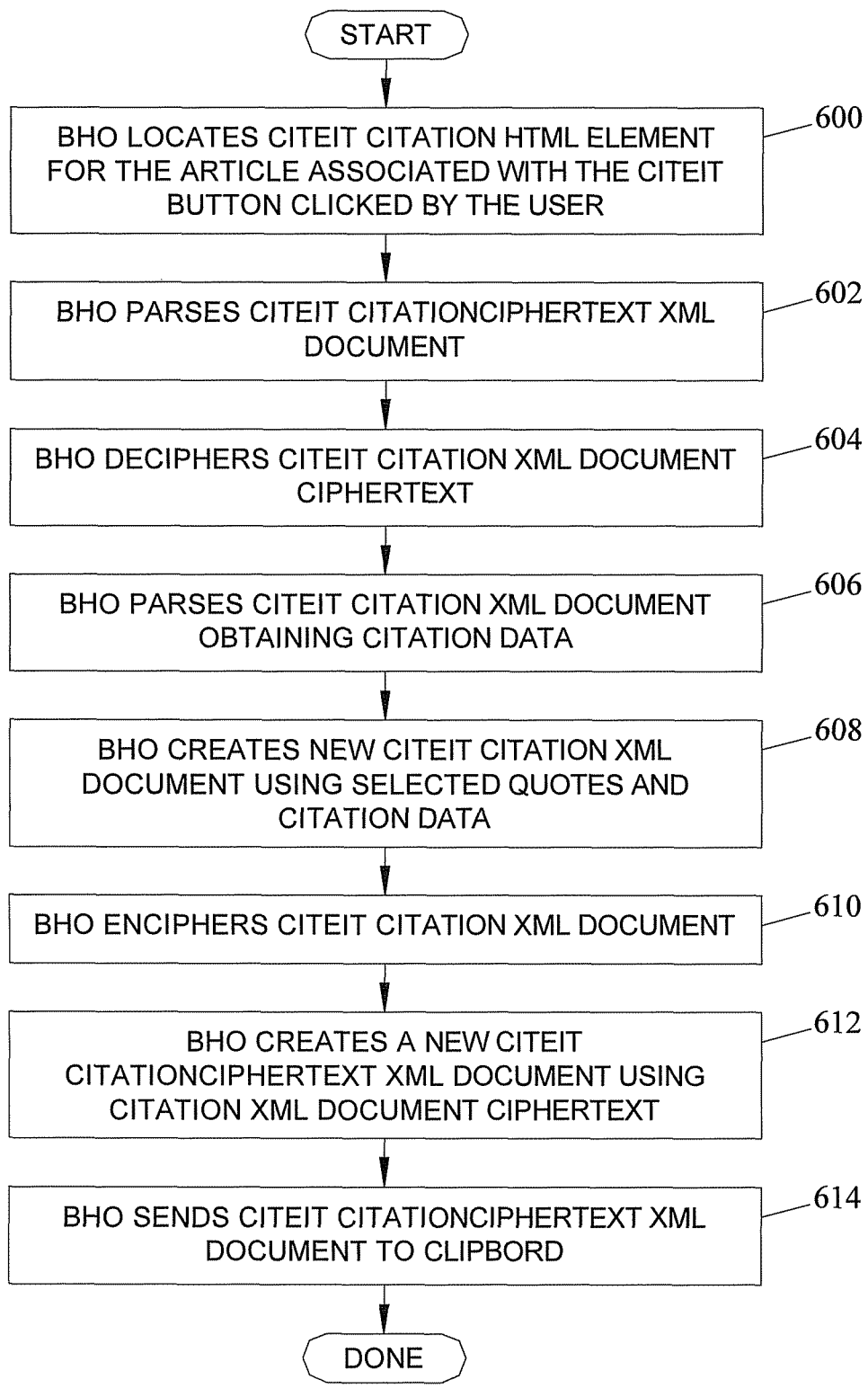
FIG. 6 is a flow chart of exemplary steps performed by a Browser Helper Object for packaging selected quotes and citation information from a source document for insertion into a destination document according to an embodiment of the subject matter described herein.

FIG. 6 is a flow chart showing the steps the Browser Helper Object (BHO) takes to package the selected quotes and citation information into an ciphertext XML document and send it to the clipboard according to an embodiment of the subject matter described herein. The BHO performs these steps to collect the selected quotes and related citation information and send them to the clipboard or directly to the user's destination document.

In block 600, the BHO locates the CiteIt citation HTML Element for the article associated with the CiteIt button clicked by the user. For example, when the BHO handles the button click event, the BHO gets the CiteIt button CiteItXml attribute value. The BHO calls the JavaScript getElementsByName function passing as a parameter value the CiteIt button CiteItXml attribute value. The getElementsByName function returns a list of the HTML tags in the web page having the specified name. The web server should create one Citation HTML Element for each article on the web page. Then the getElementsByName function returns a single <TextArea>. The BHO gets the inner HTML of the single <TextArea> tag. The <TextArea> inner HTML is the CitationCipherText XML document.

In block 602, the BHO parses the CitationCipherText XML document and gets the ciphertext version of the Citation XML document, message digest, digital signature, and Publisher's public key. The BHO deciphers the digital signature producing message digest #1.

In block 604, the BHO deciphers the ciphertext Citation XML document into plaintext. For example, the BHO hashes the plaintext Citation XML document into message digest #2. The BHO compares message digest #1 with message digest #2. When the two message digests are similar we trust the sender of the Citation XML document. Otherwise, the signature was forged and the BHO displays an error message telling the user of the problem.

In block 606, the BHO parses the Citation XML document. For example, the BHO obtains the citation information from the Citation XML document.

In block 608, the BHO creates a new Citation XML document. For example, the BHO adds the user selected quotes to the new Citation XML document. The BHO adds the citation information from the Citation XML document stored on the web page to the new Citation XML document. The BHO hashes the plaintext Citation XML producing a message digest. The BHO enciphers the message digest using $CipherAlgorithm and a private key producing a digital signature.

In block 610, the BHO enciphers the Citation XML document using $CipherAlgorithm producing ciphertext.

In block 612, the BHO creates a new CitationCipherText XML document, with the ciphertext, signature, and Browser's public key.

In block 614, the BHO sends the CitationCipherText document to the system clipboard.

User Pastes Quotes into Destination Document

Figure 7A:
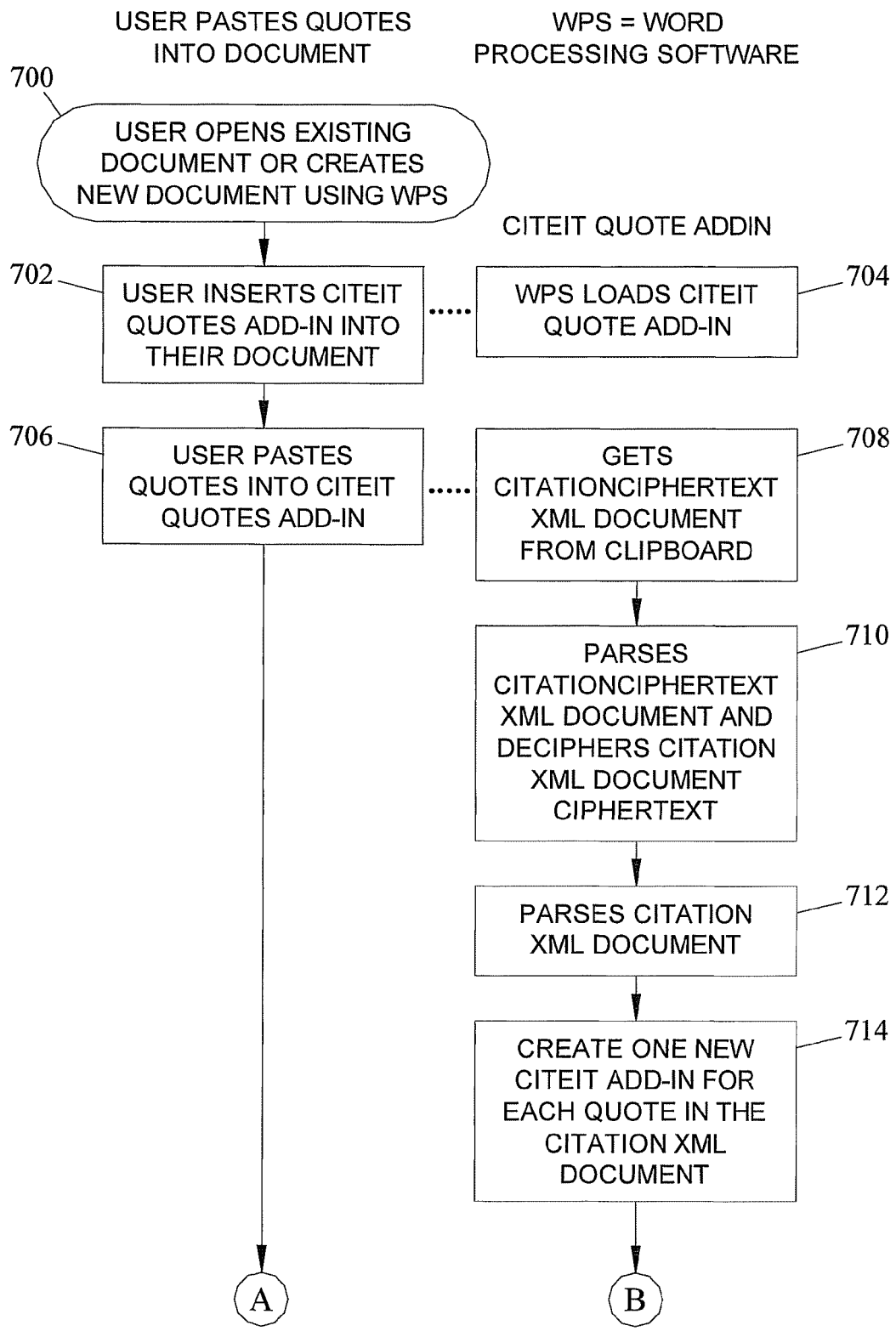
FIGS. 7A and 7B are flow charts of an exemplary process for inserting a quote into a destination document according to an embodiment of the subject matter described herein.
Figure 7B:
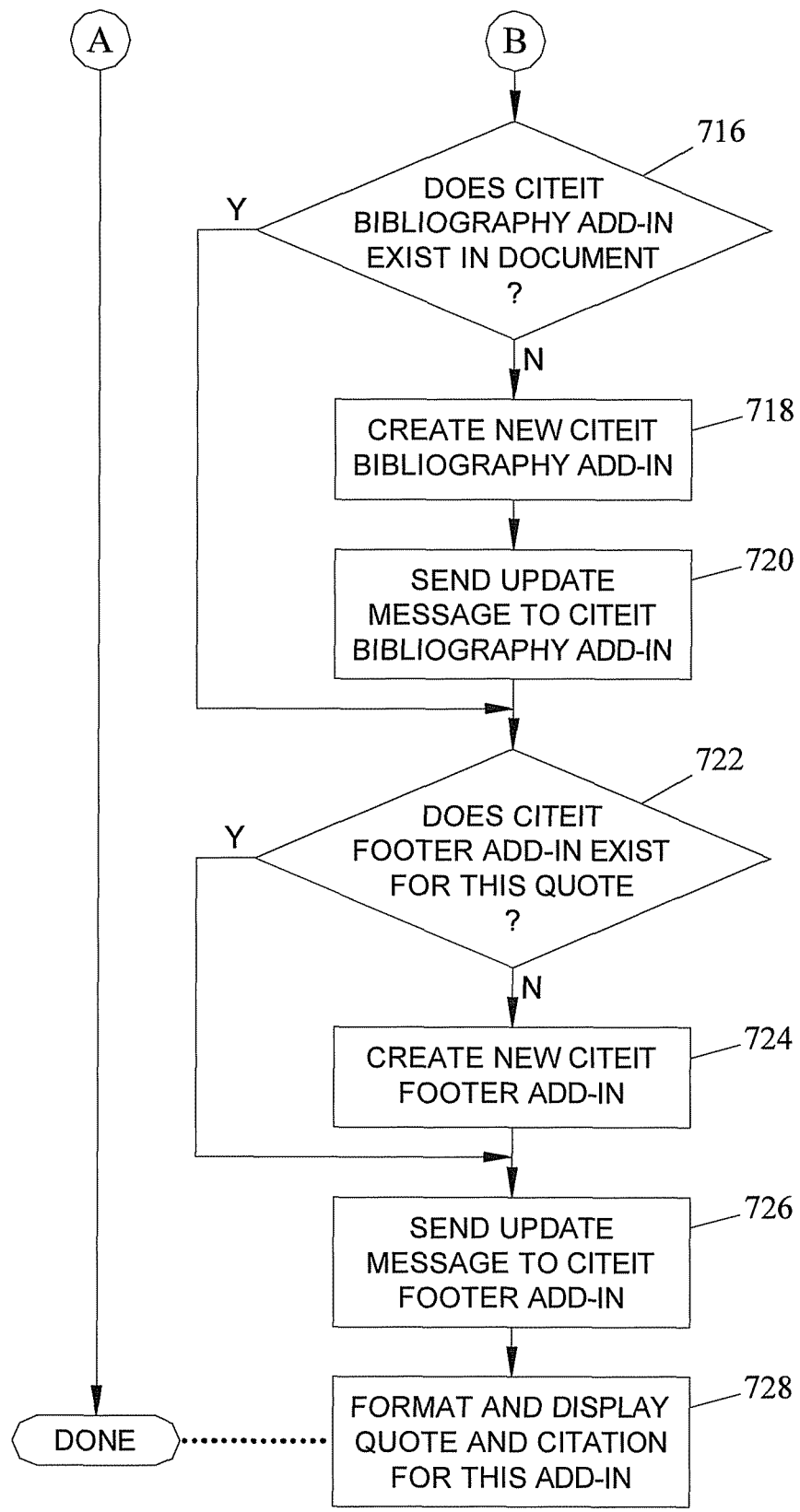

FIGS. 7A and 7B are a flow chart showing the steps a user would take to paste a quote into a destination document and the steps the CiteIt software performs to get the quote from the clipboard and display it in the destination document according to an embodiment of the subject matter described herein. Referring to FIGS. 7A and 7B, in block 700, the user opens an existing document or creates a new document using word processing application for use as a destination document.

In block 702, the user loads the CiteIt Quote Add-in.

In block 704, the word processing application loads the CiteIt Quote Add-in.

In block 706, the user pastes the clipboard contents into the CiteIt Quote Add-In. For example, the user changes focus to the destination document, selects the CiteIt Quote Add-In object the user inserted into the destination document and pastes the quote into the destination document.

In block 708, the CiteIt Quote Add-In accepts the CitationCipherText XML document from the system clipboard.

In block 710, the CiteIt Quote Add-In parses the CitationCipherText XML document. For example, the CiteIt Quote Add-In deciphers the digital signature with the public key producing message digest #1. The CiteIt Quote Add-In deciphers the ciphertext Citation XML using a private key into plaintext.

6. The CiteIt Quote Add-In hashes the plaintext Citation XML document producing message digest #2. The CiteIt Quote Add-In compares message digest #1 to message digest #2. If the message digests are similar then we trust the sender (BHO) of the CitationCipherText XMl document. Otherwise, the signature is forged and we display an error telling the user of the problem.

In block 712, the CiteIt Quote Add-In parses the Citation XML document.

In block 714, one new CiteIt Add-in is created for each quote in the Citation XML document. For example, the Add-In stores one quote and citation information in its property pages. The CiteIt Quote Add-In formats a single quote in the user's destination document in the currently selected predefined or custom citation style. The Add-In displays the single quote inline with the user's text. If the user selected an in-line citation style the Add-In formats and displays the citation information abutting the end of the quote.

In block 716, it is determined whether the CiteIt Bibliography Add-in exists in the document. If no CiteIt Bibliography Add-in exists in the document, then control proceeds to block 718, or alternatively, if a CiteIt Bibliography Add-in exists in the document, control proceeds to block 722.

In block 718, a new CiteIt Bibliography Add-in is created.

In block 720, an update message is sent to the CiteIt Bibliography Add-in.

In block 722, it is determined whether the CiteIt Footer Add-in exists for the quote. If no CiteIt Footer Add-in exists, then control proceeds to block 724. Otherwise, control proceeds to block 726.

In block 724, the CiteIt Quote Add-In creates one new CiteIt Quote Add-In object in the user's document when the recently received Citation XML document contains two or more quotes. For example, the Add-In sends the 2nd through Nth quotes and citation information to the newly created Add-Ins.

In block 726, the current Add-In sends an update message to the newly created CiteIt Quote Add-Ins asking the Quote Add-Ins to update their contents.

In block 728, the newly created CiteIt Quote Add-ins receive the update message, store the received quotes and citation information in their property pages, format and display the quote and citation information in the currently selected predefined or custom citation style.

FIG. 8 is an exemplary word processing document for receiving a secure quote and automatically generating secure citation information. Referring to FIG. 8, word processing document 800 may be an electronically editable destination document, such as a Microsoft Word document. A first portion of document 800 may be original text of the author of document 800 and therefore may be editable. For example, editable portion 802 may include material that does not contain any quoted material and does not reference the thoughts/works of another author.

In contrast, a second portion of document 800 may contain quotes requiring proper citation. For example, quoted portion 804 may be uneditable by the user, as indicated by highlighting or any other suitable means. As can be appreciated, quoted text portion 804 is an identical copy of quote selection 510 in article 506 of web page 500 as shown in FIG. 5. Moreover, CiteIt footnote add-in 112 may automatically generate appropriate uneditable footnotes 806 for inclusion in destination document 800.

CiteIt Automatically Creates Bibliography

Figure 9:
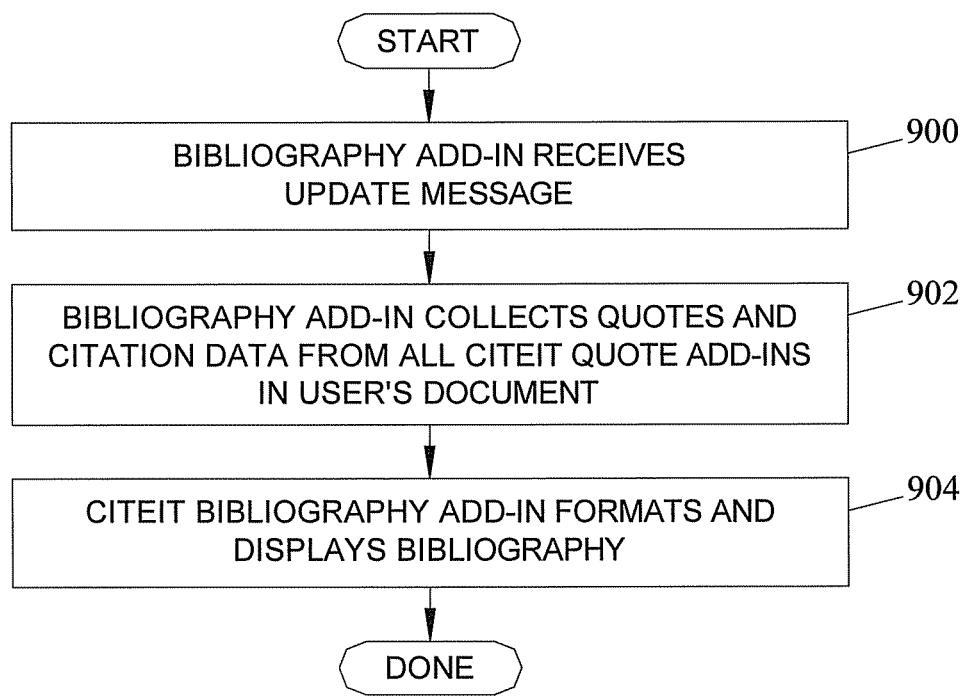
FIG. 9 is a flow chart illustrating an exemplary process for updating a bibliography in a destination document according to an embodiment of the subject matter described herein.

FIG. 9 is a flow chart illustrating exemplary steps for updating the bibliography for every CiteIt quote in the user's document according to an embodiment of the subject matter described herein. Referring to FIG. 9, in block 900, Bibliography Add-in receives Update message. For example, the user elects to display footnotes or endnotes in the destination document. The user inserts a CiteIt Footnote Add-In object into the destination document and links the CiteIt Footnote Add-In to a specific CiteIt Quote Add-In.

In block 902, the CiteIt Footnote Add-In gets the quote and citation information from the linked CiteIt Quote Add-In.

In block 904, the CiteIt Bibliography Add-in formats and displays the citation information in the user's document.

CiteIt Automatically Creates Footnotes

Figure 10:
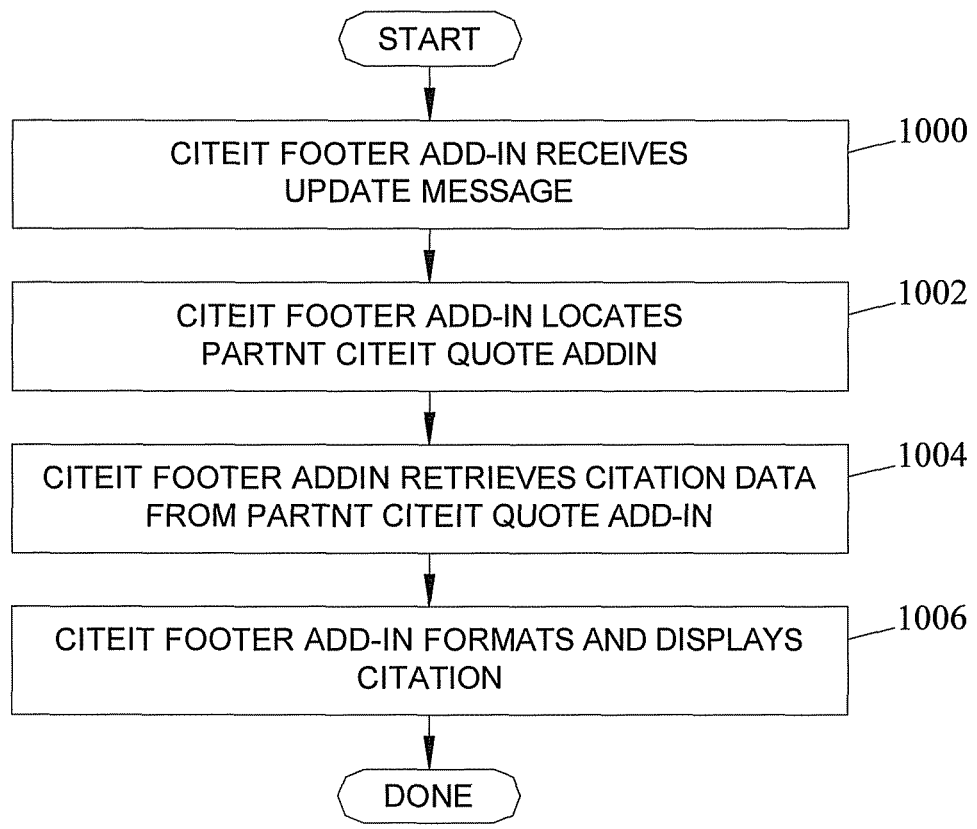
FIG. 10 is a flow chart illustrating an exemplary process for updating a citation footer according to an embodiment of the subject matter described herein.

FIG. 10 is a flow chart showing the steps for updating a citation footer according to an embodiment of the subject matter described herein. Referring to FIG. 10, in block 1000, CiteIt Footer Add-in receives Update message. For example, the user inserts a CiteIt Bibliography Add-In object into the destination document.

In block 1002, CiteIt Footer Add-in locates parent CiteIt Quote Add-in.

In block 1004, CiteIt Footer Add-in performs an update operation by locating all CiteIt Quote Add-Ins in the document, builds a list of citation information by acquiring citation information from each CiteIt Quote Add-in.

In block 1006, CiteIt Footer Add-in formats and displays the citation information in a predefined or custom citation style.

XML Format Structure

FIGS. 11A and 11B illustrate an exemplary XML schema for transferring article data between a web server, a web browser, and a destination document according to an embodiment of the subject matter described herein. For example, web server, CiteIt BHO, and CiteIt Add-Ins use XML documents to transport quotes and citation information between them. The CiteIt system uses two XML documents: CiteIt Citation XML document and the CiteIt XML document. These XML documents must be formatted correctly to ensure the CiteIt system components can parse and read the data contained in the XML documents. XML schemas describe the format of XML documents. The CiteIt XML document format is described by two associated XML schemas. FIGS. 11A-B depict the XML schema for the CiteIt Citation XML document and FIG. 12 depicts the XML schema for the CiteIt XML document. When creating CiteIt XML documents, it is appreciated that rules for HTML Entity References for special characters in XML element strings may apply. For example, the XML document must be well-formed and valid and contain a root element. A well-formed document conforms to all of XML's syntax rules. A valid document additionally conforms to some semantic rules.

Exemplary HTML tags for use with the CiteIt system are described below.

<Citation>

The XML document may contain a single set of <Citation></Citation> tags.

<Version>

The version of the source document.

<Quote>

The text selection to be copied from the source document and inserted into the destination document is included within a set of <Quote></Quote> elements. The XML document may contain a single set of <Quote></Quote> elements, or alternatively, may contain one or more <Quote></Quote> elements. It is appreciated that <Quote> elements should be placed in the XML document in the same order the user selected the quotes in the web browser.

<Title>

The title of the written work to be cited. It is appreciated that HTML formatting tags, such as, <i> italic, <b> bold, etc. should not be included in the <Title> element.

<Author>

The name of the author and/or publisher of the article. The XML document may include one or more <Author> elements. <Author> elements in the XML document should be placed in the order listed in the citation.

<Prefix>

The author's title, such as Mr., Mrs., Dr., etc.

<First>

The author's full first name. For example, the name should include the full name, without abbreviations in order to avoid possible errors.

<Middle>

The author's full middle name.

<Last>

The author's full last name.

<SuffixSocial>

The author's full social suffix, such as, junior, senior, III.

<PublicationDate>

The publication date of the written work.

<CitationContent>

Specifies what citation information is present in this XML document. For example, a WebArticle citation includes one or more of the Citation XML elements listed above.

<VolumeNumber>

Specifies the journal volume number from which this citation was retrieved.

<IssueNumber>

Specifies the issue number within a volume from which this citation was retrieved.

<SectionTitle>

Specifies the section title of a journal or book from which the citation was retrieved.

<PageNumbers>

The page numbers of the location of the quotes. Put the page numbers in the order they should be displayed in the citation.

<RetrievalDateTime>

The date and time on which the CiteIt system retrieved the quotes and citation information from a web site. The date format may include Universal Time (UTC) or any other suitable time/date format without departing from the scope of the subject matter described herein.

<WebSiteUrl>

The uniform resource locator (URL) of the written work in an IP-based communications network.

<ISBN>

International Standard Book Number (ISBN) is a unique, numerical commercial book identifier based on the 9-digit Standard Book Numbering (SBN) code that specifies a book number. The ISBN may be in any international book number format or custom book number format desired. For example, book number formats that may be described by the <ISBN> tag may include, but are not limited to, ISBN 10-digit version, ISBN 13-digit version, SBN, ISSN, and Bookland EAN-13s. An International Standard Serial Number (ISSN) is a unique eight-digit number used to identify a print or electronic periodical publication.

<DOI>

Specifies a Document Object Identifier.

<PMID>

Specifies a PubMed Unique Identifier.

<SICI>

Specifies a Serial Item and Contribution Identifier. A Serial Item and Contribution Identifier (SICI) is a code used to uniquely identify specific volumes, articles or other identifiable parts of a periodical. It is intended primarily for use by those members of the bibliographic community involved in the use or management of serial titles and their contributions. It is an extension of the ISSN. However, in contrast to an ISSN which applies to an entire publication including every volume ever printed, an SICI is a more specific identifier developed by the Serials Industry Systems Advisory Committee (SISAC) to allow references to specific parts of a journal. SICI may be defined by ANSI/NISO standard Z39.56, which is incorporated herein by reference in its entirety.

<LSID>

Specifies a Life Science Identifier. A Life Science Identifier is a way to name and locate pieces of information on the World Wide Web. An LSID is a unique identifier created according to an LSID standard for providing a method for locating and describing data.

Identifier Rules

According to one aspect, publishers may tag a written work with an identifier. These identifiers vary depending on the type of written work. For example, a book will have an ISBN, an Internet object may have a Document Object Identifier (DOI), a medical article may have a PMID, and a Life Sciences document may have a LSID associated with it.

Also, publishers indicate in which edition of a serial publication a written work appears using a volume number and issue number. The format of these numbers may vary among publishers.

The notation for some identifiers are specified in international standards, such as ISO 2108 for ISBN, which is incorporated herein by reference in its entirety.

The CiteIt system is a means of storing, transporting and displaying citation information. As such, these rules may apply to the use of Identifiers in the CiteIt system:

The publisher or author may be responsible for formatting the Identifier according to the standards for the identifier.

The CiteIt system does not validate the Identifier against any applicable standards for the Identifier. The CiteIt system may remove leading and trailing blanks prior to displaying the Identifier in a citation. The CiteIt system may apply formatting to the identifier as selected by the user in the user's document and the user's citation style.

The web server may be responsible for substituting any HTML special characters with HTML entity references when generating the Citation XML document. The web server may be responsible for removing any HTML tags from the Identifier when putting the Identifier into a Citation XML document.

HTML Entity References

Use HTML entity references to represent special characters. For example, Table 1 is a sample of special characters which can be represented as HTML entity references.

TABLE 1

| HTML Entity Reference | Description |
| --- | --- |
| & | & ampersand |
| < | < less than |
| > | > greater than |
| ' | ' apostrophe |
| " | " quotation mark |

It is appreciated that XML parsers can generate a parsing error if they detect less than '<' and greater than '>' characters in the strings between element tags. Therefore, characters should be converted to HTML entity references when these characters are contained in string to be inserted in an XML element.

XML Schema

As mentioned above, one disadvantage associated with conventional systems is that users can alter quotes and citation information when this information is transmitted or stored in plaintext. In order to ensure that quotes and citation information are not altered, data may be enciphered prior to being sent to another CiteIt component or to the user's document according to the subject matter described herein.

For example, web server 100 may create a Citation XML document, encipher the document, put the ciphertext into a XML document and send the CitationCipherText XML document to browser 104. When the user clicks on the CiteIt button, the BHO may also create a Citation XML document, encipher the document, put the ciphertext into a CitationCipherText XML document and send the CitationCipherText XML document to the clipboard.

In one embodiment, web server 100 and web browser 104 may encipher the Citation XML document using the $CipherAlgorithm and a private cipher key. An example of Citation XML document is described in greater detail below.

<Version>
The initial version of the source document.
<Citation>
The Citation XML document enciphered using the $CipherAlgorithm with the cipher key. The ciphertext XML document is encoded into the XML primitive data type base64binary.

CiteIt Citation HTML Element
This section describes the elements of the CiteIt Citation HTML Element depicted in FIG. 14. The CiteIt Citation HTML Element serves as the storage location for the citation information. The web server places the citation information in the <TextArea> tag and the CiteIt BHO retrieves the CiteIt citation information from the <TextArea> tag.

<TextArea>: The CiteIt Citation information
The HTML <TextArea> tag serves as the location for storing the CiteIt Citation information for a single article. The web server creates one <TextArea> tag for each article displayed on the web page.

The web server retrieves the citation information from a database, creates an HTML <TextArea> tag, creates a Citation XML document with the citation information, enciphers the Citation XML document, puts it into a CitationCipher XML document, inserts the CitationCipherText XML document into the HTML <TextArea> tag as inner text, and sends the HTML to the browser along with the other HTML for the page.

When the user clicks on the CiteIt button the CiteIt BHO locates the <TextArea> tag by name, retrieves the <TextArea>'s inner text which is the CitationCipherText XML document, deciphers and parses the Citation XML document, adds the quotes selected by the user and a few other additional pieces of information, creates a new Citation XML document, enciphers it and inserts it into a CitationCipherText XML document and sends it to the clipboard.

The HTML <TextArea> tag must be properly formatted in order for the CiteIt BHO to successfully locate and retrieve the XML document from the tag. Here are the formatting rules:

The web server must set the name attribute of the <TextArea> tag to an article id which identifies this citation information. The web server may set the name attribute value to any character string as long as it conforms to the HTML rules for attribute values. The name value must be unique for all CiteIt <TextArea> tags on a single web page. The web server should set the style attribute to "display:none;visibility:hidden" to hide citation information from the users view. The HTML <TextArea> tag can be placed anywhere within the opening and ending HTML <Form> tags.

<p>: The Article
The article text can be positioned at any location in the HTML document between the opening and closing <Form> tags. For illustration purposes we displayed the article text between the <TextArea> tag and the <Input> tags for this article. The article text can be displayed using any HTML tags desired. For illustration purposes the article text is displayed inside HTML <P> tags.

<Input Type="Button">: The CiteIt Button
When the user clicks on the CiteIt button for an article, the CiteIt BHO may locate the article's CitationCipherText XML document in the associated <TextArea> tag by using the article id in the CiteIt button. The web server may then creates the CiteIt button by creating a button with the name attribute set to "CiteIt". The web server adds an attribute named "CiteItXml" to the <Input> tag with the article id used in the <TextArea> name attribute.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for automatically and securely citing electronically formatted information, the method comprising:
using at least one computer:
receiving a selection of media content, the selection of media content including quoted material from one or more articles accessible via an electronic source comprising a web page, wherein the electronic source includes an extensible markup language (XML) document structure for storing and transporting citation information, wherein receiving the selection includes receiving input from the user for automatically and securely copying and citing the quoted material;
in response to the input:
making a secure copy of the quoted material; and
automatically determining citation information for the quoted material by parsing a data structure provided by an author or publisher of the quoted material;
receiving user input for pasting the quoted material into an electronic destination, and in response:
automatically inserting the citation information into the electronic destination, wherein the citation information includes a footnote and a bibliography for the quoted material in a predefined format;
using a secure browser helper object, automatically making the quoted material and the citation information uneditable in the electronic destination, wherein automatically making the quoted material and the citation information uneditable in the electronic destination includes locking the quoted material to make it uneditable in response to pasting of the quoted material in the electronic destination and automatically creating a locked footnote and a locked bibliography for all quoted material in the electronic destination that was quoted using the secure browser helper object without requiring further input from the user, and
wherein the electronic destination includes an electronic document.

2. The method of claim 1, wherein receiving a selection of media content includes receiving one of: a single quote from a single article, multiple quotes from a single article, and multiple quotes from multiple articles.

3. The method of claim 1, wherein automatically determining citation information includes receiving citation information provided by the author, the publisher, or both the author and the publisher.

4. The method of claim 1, wherein the citation information is embedded as an extensible markup language (XML) document in a hypertext markup language (HTML) page.

5. The method of claim 4, wherein the citation information is enciphered at a web server.

6. The method of claim 5, wherein the citation information is deciphered at a web client.

7. A system for automatically and securely citing electronically formatted information, the system comprising:
at least one computer;
a media content selection module implemented by the at least one computer for receiving a selection of media content, the selection of media content including quoted material from one or more articles accessible via an electronic source comprising a web page, wherein the electronic source includes an extensible markup language (XML) document structure for storing and transporting citation information, wherein receiving the selection includes receiving input from the user for automatically and securely copying and citing the quoted material,
in response to the input:
creating a secure copy of the quoted material; and
automatically determining citation information for the quoted material by parsing a data structure provided by an author or publisher of the quoted material;
receiving user input for pasting for pasting the quoted material into an electronic destination, and in response:
automatically inserting the citation information into the electronic destination, wherein the citation information includes a footnote and a bibliography for the quoted material in a predefined format; and
using a secure browser helper object, automatically making the quoted material and the citation information uneditable in the electronic destination, wherein automatically making the quoted material and the citation information uneditable in the electronic destination includes locking the quoted material to make it uneditable in response to pasting of the quoted material in the electronic destination; and a citation module implemented by the at least one computer for, in
response to the user input for automatically and securely copying and citing, automatically determining citation information for the quoted material, automatically generating and inserting the citation information into the electronic destination, and automatically making the citation information uneditable, wherein automatically determining citation information includes automatically creating a locked footnote and a locked bibliography for all quoted material in the electronic destination that was quoted using the secure browser helper object without requiring further input from the user.

8. The system of claim 7, wherein the electronic source is viewable by a web browser.

9. The system of claim 7, wherein the electronic destination is a document that is viewable and editable by a word processing application.

10. The system of claim 7, wherein the electronic source includes an extensible markup language (XML) document structure for communicating citation information between the author or publisher, the electronic source, and the electronic destination.

11. The system of claim 7, wherein the electronic source includes an extensible markup language (XML) document structure for storing and transporting the citation information in a secure fashion between the electronic source and the electronic destination.

12. The system of claim 7, wherein the electronic source includes a hypertext markup language (HTML) tag structure for storing, in an HTML web page, a CitationCipherText XML document that includes the citation information.

13. The system of claim 12, wherein the citation module includes a software module configured to operate in conjunction with a document-viewing application for decoding the CitationCipherText XML document in order to obtain the citation information, package the citation information and the CitationCipherText XML document into a new instance of CitationCipherText XML document to the document-viewing application.

14. The system of claim 13, wherein the new instance of the CitationCipherText XML document is sent to a temporary memory store.

15. The system of claim 14, wherein the temporary memory store includes a clipboard managed by an operating system.

16. The system of claim 13, wherein the new instance of the CitationCipherText XML document is sent directly to the document-viewing application.

17. The system of claim 7, wherein the electronic source includes a hypertext markup language (HTML) page including a tag for indicating to a word processing application the location of an enciphered extensible markup language (XML) document containing the citation information.

18. The system of claim 7, wherein the media content selection module includes a software Add-In for a document-viewing application which manages the selecting and highlighting of objects.

19. The system of claim 7, wherein the media content selection module includes a word processing application Add-In or extension for managing the receipt, deciphering, and parsing of objects and citation information from Citation XML and CitationCipherText XML document sent by a document viewing application; and which formats and displays objects and citation information in a user's document processing application.

20. The system of claim 7, wherein the media content selection module includes a document processing application Add-In or extension.

21. The system of claim 7, wherein the citation module is configured to format and display the citation information in a predefined citation style or a user-defined citation style.

22. The system of claim 7, wherein the citation module is configured to automatically generate and insert at least one of parenthetical citations, footnotes, endnotes, bibliography, and references citation information.

23. The system of claim 7, wherein the citation module is configured to communicate the citation information in an extensible markup language (XML) document between a publisher, a document viewing application, and the user's document processing application.

24. The system of claim 7, wherein the citation module is configured to encipher an extensible markup language (XML) document containing the citation information.

25. A non-transitory computer readable medium having stored thereon executable instructions that when executed by the processor of a computer control the computer to perform steps comprising:
  receiving a selection of media content, the selection of media content including quoted material from one or more articles accessible via an electronic source comprising a web page, wherein the electronic source includes an extensible markup language (XML) document structure for storing and transporting citation information, wherein receiving the selection includes receiving input from the user for automatically and securely copying and citing the quoted material;
  in response to the input:
    making a secure copy of the quoted material; and
    automatically determining citation information for the quoted material by parsing a data structure provided by an author or publisher of the quoted material;
  receiving user input for pasting the quoted material into an electronic destination, and in response:
    automatically inserting the citation information into the electronic destination, wherein the citation information includes a footnote and a bibliography for the quoted material in a predefined format; and
    using a secure browser helper object, automatically making the quoted material and the citation information uneditable in the electronic destination, wherein automatically making the quoted material and the citation information uneditable in the electronic destination includes locking the quoted material to make it uneditable in response to pasting of the quoted material in the electronic destination and automatically creating a locked footnote and a locked bibliography for all quoted material in the electronic destination that was quoted using the secure browser helper object without requiring further input from the user.

* * * * *